Figure 1:
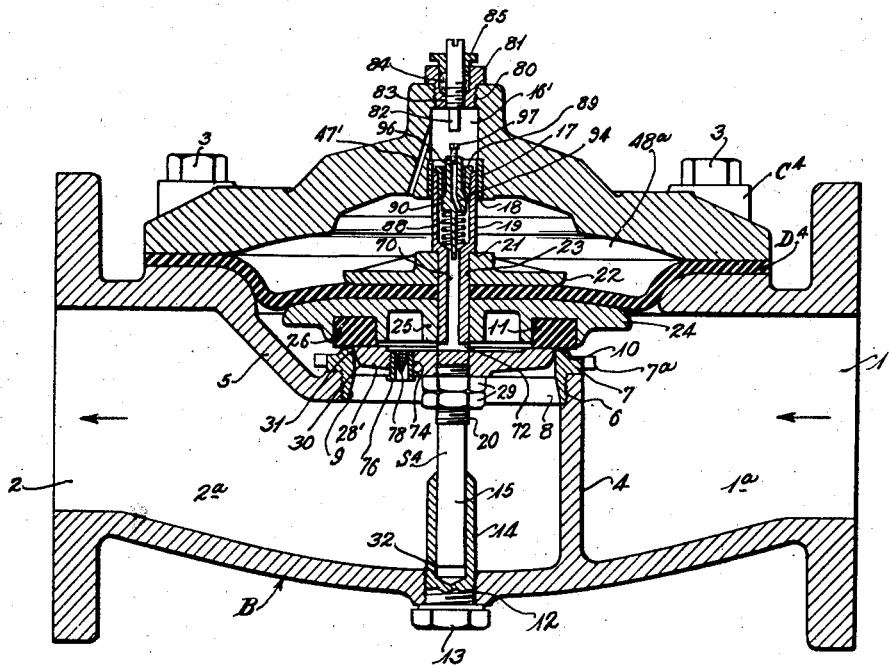

Aug. 31, 1943.                D. G. GRISWOLD                2,328,010
                               CHECK VALVE
                         Original Filed May 1, 1940

Inventor

Donald G. Griswold

By Bacon & Thomas

Attorneys

Patented Aug. 31, 1943

2,328,010

UNITED STATES PATENT OFFICE 2,328,010

CHECK VALVE

Donald G. Griswold, Alhambra, Calif., assignor to Clayton Manufacturing Company, Alhambra, Calif.

Original application May 1, 1940, Serial No. 332,823. Divided and this application February 2, 1943, Serial No. 474,447

10 Claims. (Cl. 137—153)

The present invention relates to check valves, and more particularly to a self-governing check valve designed to operate efficiently and quietly, and to open automatically whenever the pressure on the inlet side of the valve is greater than that on the outlet side of the valve and to close automatically when these pressure conditions are reversed.

One of the most common objections to known types of check valves is that they have a tendency to slam closed whenever there is an interruption of flow or change in pressure. Such valves are usually constructed so that the closing member or valve disc, whether it be hinged or movable bodily, travels in a direction opposite to that of the normal flow of fluid to effect closing of the valve. In other words, the closing member travels in the same direction as the attempted return flow of fluid and the inertia of the fluid causes the disc to slam or suddenly strike against its seat. It is this sudden seating, resulting in the sudden stopping of the moving return stream, that sets up a back surge or a knock producing what is commonly referred to as "line shock" or "water hammer." Aside from the undesirable noise incident to hammering, there is the more serious danger of the piping bursting from sudden excess pressure or breaking as the result of vibratory strains imposed by repeated shock. This situation commonly occurs when a conventional check valve is used at the end of a long water line. Furthermore, when such check valve is used at the discharge of a pulsating pump, the valve disc is caused to strike its seat with every pulsation of the pump, producing frequent and repeated hammerlike blows on the valve disc and seat which quickly destroy the valve. The objection and danger increase, of course, with the size of the valve.

In contrast, the check valve of the present invention is constructed so that, regardless of size, it is impossible for the return flow to slam the valve shut and produce hammering or line shock. While in previous valves, the closing member has been directly urged against its seat by the attempted return flow and the closing member has thus been caused to travel in the same direction as the return flow, the closing member of the valve of the present invention is positively moved in a direction opposite to and against such flow to effect closing of the valve. Stated differently, the closing member of the present valve actually cuts off flow by moving in the same direction as that of the fluid normally flowing through the valve. The operation of the closing member of the present check valve is independent of the back surge or return flow, and contrary to the action of other valves, it does not suddenly cut off the return flow but does act directly thereon, closing slowly and positively at such a rate as to gradually cut off the return flow; thereby avoiding damage to the valve and the pipe line.

One important advantage of the above action is that in a pulsating line, the valve disc or closing member normally does not have sufficient time to respond to the rate of flow change and it, therefore, remains partially or fully open without the disc touching the seat on every pulsation of the pump, as is the case with an ordinary type of check valve. In normal operation the present valve is either fully open or fully closed. The fact that the valve is always wide open when the flow is in the normal direction constitutes a desirable advantage, in that it reduces the resistance to the flow of liquid and, therefore, results in lower pumping costs.

Valves constructed in accordance with the present invention operate upon a pressure differential in the inlet and outlet sides of the valve. The valve disc or closing member of the valve is operated by a diaphragm which is responsive to the differences in pressure. Means is associated with the outlet chamber of the valve for controlling the rate of flow of the pressure fluid to the diaphragm chamber. This control means is arranged so that the valve disc operates at two speeds, i. e., it may move rapidly toward its seat during the major portion of its travel and move at a comparatively slower rate during the remainder of its travel to effect a generally quick closing and a gradual throttling of the return flow during the final closing of the valve.

The primary object of the invention is to provide a check valve which will be free from the above noted objections and which will have the advantage of controlling the flow of water or other fluid without producing chattering, line shock or hammering. These objections are overcome and the advantages obtained by providing a check valve whose closing action is definitely controlled so as to preclude line shock and hammering.

One of the important objects of the invention is to provide a check valve of the diaphragm type which is automatically responsive to the pressure of the medium passing therethrough and which will close quietly against any return flow with a governed closing action.

Another object of the invention is to provide a check valve which will close quickly through a major portion of its closing movement and which will complete the closing movement relatively slowly; and further, which can be reopened to its fullest extent without undue delay.

Still another object of the invention is to provide a pressure operated check valve in which the stem of the valve is utilized, in conjunction with suitable ports, as a means for governing or regulating the flow of pressure fluid to a chamber to control the opening and closing of the valve.

A further object of the invention is to provide a check valve with a guided valve disc and a cooperating seat and choke washer arranged to eliminate noise during opening and closing.

Another object of the invention is to provide a check valve construction in which the period of closing of the valve may be adjusted or varied as desired to meet specific conditions; for example, in certain installations employing large diameter pipe lines of great length and valves of large size, a total closing period of one to two minutes or more may be necessary to cut off flow without producing line shock or hammering.

A further object of the invention is to provide a check valve which is positive in its operation and which will not waver or flutter between open and closed positions, but which in normal operation will be either completely closed or fully open; complete closing avoiding undesirable leakage through the valve, and full opening enabling the valve to operate with maximum efficiency without restricting or impeding flow therethrough.

A still further object of the invention is to provide an automatic check valve which is comparatively simple in construction, relatively inexpensive to manufacture, and which requires no substantial servicing.

Figure 2:
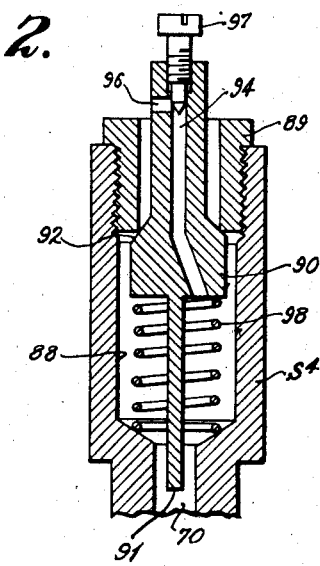

Other and further objects of the invention will be apparent from the following description, taken in connection with the accompanying drawing, in which:

Figure 1 illustrates an automatic check valve of the diaphragm type in which the pressure fluid for operating the valve is taken into the guide for the operating stem at a high point on the discharge side of the valve and in which the valve stem is provided with pilot valve means arranged to throttle the admission of pressure fluid into the diaphragm chamber toward the end of the movement toward the valve seat to assure a slow closing of the valve and to permit relatively quick exhaust of such fluid to provide for rapid opening of the valve; and Figure 2 is an enlarged view of the pilot valve shown in Figure 1.

Referring now to Figure 1 of the drawing, the letter B indicates the valve body and the numerals 1 and 2, respectively, indicate the inlet and outlet sides of the valve. The letter $C^4$ indicates the cap of the valve and the letter $D^4$ indicates a circular diaphragm whose marginal portion is clamped between the body B and the cap $C^4$ by any suitable number of cap screws 3.

The body B is provided at its inlet side 1 with a substantially vertical partition wall portion 4 forming an inlet chamber $1^a$, and an angular wall portion 5 which cooperate with the wall 4 to form an oulet chamber $2^a$. The wall portions 4 and 5 are merged to provide a circular opening 6 which is threaded and adapted to receive an annular valve seat 7. The valve seat 7 is provided with a circular opening 8 which flares outwardly toward the bottom of the valve body as indicated at 9. The upper surface of the valve seat 7 adjacent the opening 8 is provided with a declining beveled portion 10 adapted to cooperate with a valve disc 11 to form a leak-proof seal, as will be explained more fully hereinafter. The valve seat 7 is further provided with circumferential projections $7^a$ adapted to be engaged by a spanner wrench for tightly securing the seat in the threaded opening 6.

The valve body B has a threaded opening 12 axially aligned with the opening 8 in the valve seat 7. An elongated plug 13 is threaded into the opening 12 and includes a tubular guide portion 14 for one end 15 of a valve stem $S^4$. The cap member $C^4$ also has a recess 16' counterbored at 17 to receive a guide bushing 18 for the upper end 19 of the valve stem $S^4$. The recess 16' is located in the cap member $C^4$ so that it is axially aligned with the tubular guide portion 14 and the opening 8 of the valve seat.

The valve stem $S^4$ has a threaded portion 20 intermediate its lower end 15 and its upper end 19. The end 15 is of slightly less diameter than the threaded portion 20 and has a snug sliding fit in the tubular guide portion 14 of the plug 13. The upper end 19 of said valve stem is enlarged to provide a shoulder at 21 and, moreover, is snugly guided in the bushing 18. Thus, the plug 13 and bushing 18 are arranged to guide the stem $S^4$ during vertical movement.

An upper diaphragm supporting plate 22 is adapted to be received upon the stem $S^4$ and to abut the shoulder 21 with the upper side thereof. The upper side of the diaphragm $D^4$ is engaged with the lower side of the plate 22 and is provided with an aperture 23 through which the valve stem $S^4$ extends. The lower side of the diaphragm $D^4$ is adapted to engage the upper side of a lower diaphragm supporting plate 24, and the valve stem $S^4$ extends through a central boss 25 in said plate. The lower supporting plate 24 is also provided with a channel 26 formed in the lower side thereof to receive the valve disc 11 previously referred to. A combined clamping member and choke washer 28' is adapted to be mounted upon the stem $S^4$ and to engage the inner peripheral portion of the valve disc 11. Clamping nuts 29 are threaded upon the portion 20 of the valve stem $S^4$ and serve to retain the valve stem, the diaphragm supporting plates 22 and 24, the valve disc 11, and the choke washer 28' in assembled relation with the diaphragm $D^4$.

The outer diameter of the clamping member or choke washer 28' is preferably only slightly less than that of the opening 8 in the valve seat 7. In a six-inch valve, for example, the minimum radial clearance may be only three- or four-thousandths of an inch. The peripheral portion of the choke washer 28' is preferably rounded, as indicated at 30, and is tapered outwardly and upwardly from said rounded portion to substantially its upper outer edge as indicated at 31. The rounded and tapered peripheral portions of the choke washer 28' serve to gradually cut off the flow through the opening 8, and the beveled portion 10 of the valve seat 7 cooperates with the valve disc 11 to reduce eddying and to form a theoretical line-contact seal, whereby quiet, smooth and chatterless operation of the valve is obtained.

The tubular guide 14 for the lower end of the valve stem $S^4$ is pierced by one or more transverse openings 32 to establish communication with the outlet chamber $2^a$ of the valve and the interior of said guide whereby the valve stem $S^4$ is unrestrained in its movement by any fluid within said guide. The valve stem S⁴ is provided with a longitudinal passageway 70 which merges into a transverse passageway 72 positioned at a point in the stem above the choke washer or clamping member 28'. The clamping member 28' is provided with a recess 74 into which a screening plug 76 is threaded. The plug 76 contains a screening element 78 adapted to prevent the entry of any foreign matter into the passages of the valve stem S⁴. The cover C⁴ is provided with a threaded opening 80 adjacent to the counterbored recess 16'. A plug 81 is threaded into the opening 80 and an adjustable stop 82 is threadedly mounted in said plug. The stem portion 83 of said stop member is surrounded by packing 84 and a gland 85 is provided to compress the packing about said stem to provide a fluid-tight seal therefor.

The stem S⁴ is provided with an enlarged counterbore 88 at the upper end thereof which merges with the longitudinal passageway 70. The counterbore 88 is threaded at its upper end to receive a collar 89. A pilot or check valve 90 is adapted to be received in said counterbore and to be retained therein by the collar 89. As is clearly shown in the drawing, the pilot valve 90 is provided with a depending leg 91 which projects into the passageway 70 and serves as a guide, the size of the leg 91 being such as not to impede the flow of fluid through the passage 70 to an extent such as would prevent quick opening or closing of the valve at the appropriate times.

The exterior of the pilot valve 90 is beveled as indicated at 92 and adapted to seat upon the lower inner edge of the collar 89. The pilot valve 90 is further provided with a longitudinal passageway 94 and a transverse passageway 96. Flow through the passageways 94 and 96 of said valve is controlled by a needle valve 97 threadedly mounted in the upper end of the pilot valve. A compression spring 98 surrounds the guide 91 of the pilot valve 90 and normally tends to maintain the valve in seated position. However, the strength of the spring 98 is such that it does not exert any substantial pressure against the valve to effect closing thereof, but just sufficient to overcome the weight of the valve and keep the same closed until the spring is overcome by pressure acting downwardly upon the pilot valve 90 or until the head of the needle valve 97 abuts the stop 82 during the opening of the valve.

To regulate the closing of the check valve shown in Figure 1, the needle valve 97 is properly adjusted to constrict the flow of pressure fluid through the passageways 94 and 96, and thence through the recess 16', passage 47' into the diaphragm chamber 48ª.

Assuming, for example, that the valve is about to open due to a pressure drop in outlet chamber 2ª, the pressure in inlet chamber 1ª acting upon the underside of the diaphragm D⁴ will subject the fluid in the diaphragm chamber 48ª to pressure and while some of said fluid will back up through the passageways 94 and 96 in the pilot valve 90, the pressure created is normally sufficient to overcome the effect of spring 98 and force the pilot valve 90 downwardly in the stem S⁴, thereby permitting fluid in larger volume to by-pass the needle valve 97 and exhaust through said valve stem into the outlet chamber 2ª. However, in the event that fluid pressure does not depress the pilot valve 90, said valve will be mechanically depressed by engagement of the needle valve 97 with the stop 82 as the stem S⁴ moves upwardly, and thus, quick opening of the check valve will be assured in any event.

It will be understood that the rate of opening movement of the check valve is greater after the pilot valve 90 has been displaced, since the return flow of spent fluid by-passing said pilot valve is then at a greater rate than normally takes place through the passageways 94 and 96.

The pilot valve 90 will remain in its depressed position and the check valve will be wide open until a pressure in excess of the inlet pressure prevails on the outlet side of the check valve. This same pressure will then exist in the diaphragm chamber 48ª and cause the valve stem S⁴ to move rapidly downwardly to cut off flow through the valve. After the valve stem S⁴ has moved downwardly a distance sufficient for the lower edge of the collar 89 to engage the beveled portion 92 of the pilot valve 90, rapid flow of pressure fluid to the diaphragm chamber will be cut off and the rate of flow through passageways 94 and 96 restricted to that afforded by the adjustment of the needle valve 97. In this manner the final closing movement of the valve is definitely slowed up.

In a valve of the type shown in Figure 1, the portion of the stem stroke during which relatively slow closing movement is desired can obviously be accurately determined by the adjustment of stop 82. Furthermore, the needle valve 97 in pilot valve 90 may be adjusted to predetermine the rate of travel during said portion of the stem stroke. An important feature of this type of check valve is that the initial travel of the stem during its opening movement is not necessarily at the same rate as the final closing movement, because, as has been pointed out, displacement of the pilot valve 90 and quick opening of the check valve may begin before the needle valve 97 actually engages the stop 82.

During both the opening and closing of the valve, the valve disc 11 is guided by the stem S⁴ so that it uniformly disengages and contacts the face of the seat 7. The guiding of the valve disc 11 is important, especially during closing, because if the valve disc is not constrained, it will seat upon one side first, and a squeal or a noise comparable to "razzing" will result as it finally seats on the other side and cuts off the flow. Moreover, closing the valve against the flow of the return stream instead of with the direction of such flow eliminates slam and the hammering incident to sudden checking of the return flow. The choke washer 28' also contributes to quiet operation of the valve, in that it cooperates with the opening 8 in the valve seat to gradually restrict the flow and substantially cut it off just before seating of the valve disc 11 occurs, thereby eliminating any tendency of the valve disc to flutter.

Thus it will be apparent that a two-speed check valve has been provided which is automatic and self-governing in its operation and which has the highly desirable advantage of quick opening and substantially quick closing, but whose final closing movement is regulated so as to eliminate sudden closing of the valve with its accompanying hammering and line shock.

The present application is a division of my copending application Serial No. 332,823, filed May 1, 1940, and entitled "Check valves."

It will be understood that the principles of the invention may be embodied in valves different from that illustrated herein without departing

I claim:

1. In an automatic check valve comprising a body having inlet and outlet chambers, a diaphragm for controlling the flow from said inlet to said outlet chamber and a pressure chamber for operating fluid for said diaphragm; a valve stem connected to said diaphragm, said valve stem having a passageway in continuous communication with said outlet chamber and said pressure chamber; and spring-pressed means in said passageway carried by said valve stem for controlling the rate of flow therethrough, said means having a passageway therethrough smaller in size than said passageway in said valve stem.

2. A self-governing check valve comprising, a body; a flexible diaphragm for controlling the flow of fluid through said body; a pressure chamber for operating fluid for said diaphragm; a valve stem connected to said diaphragm, said valve stem having a passageway in continuous communication with said body and said pressure chamber; and a pilot valve floatingly mounted in said passageway of said valve stem for controlling the rate of flow of fluid through the passageway of said stem, said pilot valve having a passageway therethrough smaller in size than said passageway in said valve stem.

3. A self-controlled check valve, comprising: a body having inlet and outlet chambers; a diaphragm for controlling the flow of fluid from said inlet chamber to said outlet chamber; a pressure chamber for operating fluid for said diaphragm; a valve stem connected to said diaphragm, said valve stem having a passageway communicating with said outlet chamber and said pressure chamber; a pilot valve in said passageway for controlling the flow therethrough, said pilot valve having a passage; and means for varying the rate of flow of fluid through the passage of said pilot valve.

4. A self-governing check valve, comprising: a body having inlet and outlet chambers; a diaphragm for controlling the flow of fluid from said inlet chamber to said outlet chamber; a pressure chamber for operating fluid for said diaphragm; a valve stem connected to said diaphragm, said valve stem having a passageway communicating with said outlet chamber and said pressure chamber; a spring-pressed pilot valve in said passageway, said pilot valve having a passage extending therethrough for the passage of fluid from said pressure chamber at a slow rate; and a stop member in said body adapted to be engaged by said pilot valve after said valve stem starts to move toward open position, whereby said pilot valve will be mechanically held open and fluid can by-pass said pilot valve and flow from said pressure chamber at a relatively higher rate to permit a quick opening of the valve.

5. A check valve having a controlled closing action, comprising: a body having inlet and outlet chambers; a diaphragm for controlling the flow of fluid from said inlet to said outlet chamber; a pressure chamber for operating fluid for said diaphragm; a valve stem adapted to reciprocate in said body; means connecting said diaphragm to said valve stem, said valve stem having a longitudinal passageway in communication with said outlet chamber and said pressure chamber; a pilot valve mounted in one end of said valve stem; a spring normally maintaining said pilot valve in closed position, said pilot valve having a restricted passageway therethrough in communication with said pressure chamber and the longitudinal passageway in said valve stem; and a needle valve arranged to control the flow through the restricted passageway in said pilot valve to said pressure chamber.

6. A check valve comprising: a body having inlet and outlet chambers; a cover plate; a diaphragm for controlling the flow of fluid from said inlet to said outlet chamber; a pressure chamber for operating fluid for said diaphragm; a valve stem adapted to reciprocate in said body; means in said body for guiding said valve stem; means connecting said diaphragm to said valve stem comprising a clamping member and supporting plates arranged on opposite sides of said diaphragm, said clamping member having a passage extending therethrough and said valve stem having a transverse and a longitudinal passageway in communication with the passageway in said clamping member; a pilot valve mounted in one end of said valve stem; a spring normally maintaining said pilot valve in closed position, said pilot valve having a restricted passageway therethrough in communication with the longitudinal passageway in said valve stem and said pressure chamber; and a stop member carried by said cover plate and adapted to be engaged by said pilot valve and to open the same upon a given opening movement of said valve stem.

7. An automatic check valve, comprising: a body having inlet and outlet openings; means for controlling the flow from said inlet opening to said outlet opening; a pressure chamber for operating fluid for said means; a valve stem connected to said means, said valve stem having a passageway in continuous communication with one of said openings and with said pressure chamber; and check valve means in said passageway carried by said valve stem for controlling the rate of flow therethrough, said check valve having a passageway therethrough smaller in size than said passageway in said valve stem.

8. A self-controlled check valve comprising: a body having inlet and outlet openings; means for controlling the flow of fluid from said inlet opening to said outlet opening; a pressure chamber for operating fluid for said means; a valve stem connected to said means, said valve stem having a passageway communicating with said outlet opening and with said pressure chamber; a pilot valve in said passageway for controlling the flow therethrough, said pilot valve having a passage; and means for varying the rate of flow of fluid through the passage of said pilot valve.

9. A self-governing check valve, comprising: a body having inlet and outlet openings; means for controlling the flow of fluid from said inlet opening to said outlet opening; a pressure chamber for operating fluid for said means; a valve stem connected to said means, said valve stem having a passageway communicating with said outlet opening and said pressure chamber; a reciprocable pilot valve in said passageway, said pilot valve having a relatively restricted passage extending therethrough for the passage of fluid from said pressure chamber at a slow rate; and means arranged to unseat said pilot valve after said valve stem starts to move toward open position, whereby said pilot valve will be held open and fluid can by-pass said pilot valve and flow from said pressure chamber at a relatively higher rate to permit a quick opening of the valve.

10. A check valve comprising: a body having inlet and outlet chambers; a diaphragm for controlling the flow of fluid from said inlet to said outlet chamber; a pressure chamber for operating fluid for said diaphragm; a valve stem adapted to reciprocate in said body; means connecting said diaphragm to said valve stem comprising a supporting plate and a clamping member below said supporting plate on one side of said diaphragm and a clamping plate on the other side of said diaphragm, said clamping member having a passage extending therethrough and said valve stem having a transverse and longitudinal passageway in communication with the passageway in said clamping member; and a pilot valve mounted in one end of said valve stem for controlling the flow of fluid through said valve stem, said pilot valve having a restricted passageway therethrough in communication with the longitudinal passageway in said valve stem and said pressure chamber.

DONALD G. GRISWOLD.